(12) United States Patent
Carow et al.

(10) Patent No.: US 8,015,726 B2
(45) Date of Patent: *Sep. 13, 2011

(54) AUTOMATIC CLOTHES DRYER

(75) Inventors: James P. Carow, St. Joseph, MI (US); Mark E. Glotzbach, Mishawaka, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/163,592

(22) Filed: Oct. 24, 2005

(65) Prior Publication Data
US 2006/0288605 A1 Dec. 28, 2006

Related U.S. Application Data

(63) Continuation-in-part of application No. 11/160,433, filed on Jun. 23, 2005, now abandoned.

(51) Int. Cl.
*F26B 11/00* (2006.01)
(52) U.S. Cl. ............. 34/381; 34/413; 34/497; 34/527; 34/528; 34/530; 34/534; 340/635; 340/679; 73/204.27; 431/28; 431/18; 702/47; 68/17 R; 68/19 R; 8/158
(58) Field of Classification Search ............ 34/381, 34/389, 417, 446, 413, 497, 527, 528, 530, 34/534; 340/635, 679; 73/204.27; 8/158; 431/28; 68/17 R, 18 R; 702/47
See application file for complete search history.

(56) References Cited

U.S. PATENT DOCUMENTS

| | | | | |
|---|---|---|---|---|
| 2,050,254 A * | 8/1936 | Barnsteiner | | 34/553 |
| 2,114,776 A * | 4/1938 | Davis | | 68/18 R |
| 2,202,045 A * | 5/1940 | Cohn et al. | | 34/393 |
| 2,217,153 A * | 10/1940 | Bowdoin et al. | | 34/527 |
| 2,225,407 A * | 12/1940 | Bassett, Jr. | | 68/12.21 |
| 2,540,955 A * | 2/1951 | Moore | | 34/605 |
| 2,742,708 A * | 4/1956 | McCormick | | 34/76 |
| 2,797,497 A * | 7/1957 | Engel J et al. | | 34/543 |
| 2,885,789 A * | 5/1959 | Conkling et al. | | 34/547 |
| 2,892,334 A * | 6/1959 | Gray, Jr. | | 68/12.15 |
| 2,941,308 A * | 6/1960 | Cobb et al. | | 34/552 |
| 2,949,679 A * | 8/1960 | MacCracken et al. | | 34/598 |
| 2,961,776 A * | 11/1960 | Hughes | | 34/607 |
| 2,985,966 A * | 5/1961 | Martin | | 34/75 |
| 3,009,256 A * | 11/1961 | Lynch | | 34/527 |
| 3,027,653 A * | 4/1962 | Long et al. | | 34/86 |
| 3,028,680 A * | 4/1962 | Conlee et al. | | 34/145 |
| 3,061,906 A * | 11/1962 | Coggin | | 26/106 |

(Continued)

FOREIGN PATENT DOCUMENTS

DE 3438575 A1 * 4/1986

(Continued)

*Primary Examiner* — Stephen M. Gravini
(74) *Attorney, Agent, or Firm* — Clifton G. Green; McGarry Bair PC

(57) ABSTRACT

An automatic clothes dryer comprises a cabinet defining an interior space in which is rotatably mounted a drum that defines a drying chamber, a heater assembly having a heating element for heating air, and a motor for rotating the drum. A blower is mounted within the interior space and is fluidly coupled to the drying chamber for moving heated air through the drying chamber. A first temperature sensor is mounted upstream of the heating element. A second temperature sensor is mounted downstream of the blower. Outputs from the temperature sensors are utilized with one or more methods to determine the air flow characteristics through the dryer.

27 Claims, 8 Drawing Sheets

U.S. PATENT DOCUMENTS

| | | | | |
|---|---|---|---|---|
| 3,066,519 A | * | 12/1962 | Harbor et al. | 68/12.08 |
| 3,080,252 A | * | 3/1963 | Freier et al. | 427/2.3 |
| 3,085,347 A | * | 4/1963 | Justus | 34/556 |
| 3,088,221 A | * | 5/1963 | Pansing et al. | 34/527 |
| 3,106,831 A | * | 10/1963 | Behrens | 68/12.08 |
| 3,125,422 A | * | 3/1964 | Thunander | 34/527 |
| 3,161,481 A | * | 12/1964 | Edwards | 34/527 |
| 3,162,032 A | * | 12/1964 | Behrens | 68/18 F |
| 3,186,107 A | * | 6/1965 | Raley | 34/527 |
| 3,203,769 A | | 8/1965 | Williams et al. | 432/44 |
| 3,205,590 A | * | 9/1965 | Deaton | 34/527 |
| 3,217,422 A | * | 11/1965 | Fuqua et al. | 34/527 |
| 3,217,423 A | * | 11/1965 | Lynch | 34/527 |
| 3,231,909 A | * | 2/1966 | Candor | 8/159 |
| 3,238,636 A | * | 3/1966 | Chafee, Jr. et al. | 34/527 |
| 3,242,589 A | * | 3/1966 | Jacobs | 34/595 |
| 3,263,343 A | * | 8/1966 | Loos | 34/82 |
| 3,266,168 A | | 8/1966 | Sones et al. | 34/45 |
| 3,269,027 A | * | 8/1966 | Harnden, Jr. | 34/553 |
| 3,270,761 A | * | 9/1966 | Pansing | 137/88 |
| 3,273,256 A | * | 9/1966 | Behrens | 34/546 |
| 3,286,361 A | * | 11/1966 | Cobb et al. | 324/40 |
| 3,286,508 A | * | 11/1966 | Spiegel | 73/38 |
| 3,347,065 A | * | 10/1967 | Hunt | 68/12.15 |
| 3,358,302 A | * | 12/1967 | Candor | 8/159 |
| 3,402,576 A | * | 9/1968 | Krupsky | 68/4 |
| 3,417,480 A | * | 12/1968 | Thunander | 34/528 |
| 3,432,938 A | * | 3/1969 | Miller | 34/533 |
| 3,471,937 A | * | 10/1969 | Genbauffe | 34/527 |
| 3,475,831 A | * | 11/1969 | Workman | 34/82 |
| 3,484,772 A | * | 12/1969 | McConnell et al. | 340/607 |
| 3,583,688 A | * | 6/1971 | Fuqua et al. | 432/44 |
| 3,612,500 A | | 10/1971 | Cramer | 34/45 |
| 3,621,202 A | * | 11/1971 | Rudolf Gemert | 219/492 |
| 3,748,852 A | * | 7/1973 | Cole et al. | 60/725 |
| 3,782,001 A | * | 1/1974 | Cotton | 34/532 |
| 3,786,220 A | | 1/1974 | Harnden, Jr | |
| 3,786,222 A | | 1/1974 | Harnden, Jr. et al. | |
| 3,815,257 A | * | 6/1974 | Freze | 34/129 |
| 3,822,482 A | * | 7/1974 | Cotton | 34/528 |
| 3,824,476 A | * | 7/1974 | Cotton | 327/509 |
| 3,824,477 A | * | 7/1974 | Cotton | 327/509 |
| 3,849,815 A | * | 11/1974 | Frauendorf | 8/149.1 |
| 3,899,108 A | * | 8/1975 | Frauendorf | 223/51 |
| 3,942,265 A | * | 3/1976 | Sisler et al. | 34/124 |
| 3,944,841 A | * | 3/1976 | Janke | 307/38 |
| 4,053,992 A | * | 10/1977 | Furgal | 34/60 |
| 4,083,118 A | * | 4/1978 | Cotton | 34/562 |
| 4,086,707 A | * | 5/1978 | Bochan | 34/554 |
| 4,088,017 A | * | 5/1978 | Olges | 73/168 |
| 4,112,590 A | * | 9/1978 | Muller | 34/75 |
| 4,123,851 A | * | 11/1978 | Itoh et al. | 34/549 |
| 4,125,946 A | * | 11/1978 | Prager | 34/80 |
| 4,185,611 A | * | 1/1980 | Johnson | 126/506 |
| 4,204,338 A | * | 5/1980 | Bullock | 34/467 |
| 4,206,552 A | * | 6/1980 | Pomerantz et al. | 34/445 |
| 4,231,166 A | | 11/1980 | McMillan | 34/48 |
| 4,257,170 A | * | 3/1981 | Gestblom et al. | 34/553 |
| 4,281,465 A | * | 8/1981 | Zimmermann et al. | 34/640 |
| 4,286,391 A | | 9/1981 | Gerry | 34/44 |
| 4,287,753 A | * | 9/1981 | Grantham | 73/29.05 |
| 4,312,138 A | * | 1/1982 | Ellington | 34/533 |
| 4,337,071 A | * | 6/1982 | Yang | 62/600 |
| 4,385,452 A | * | 5/1983 | Deschaaf et al. | 34/562 |
| 4,397,101 A | * | 8/1983 | Rickard | 34/486 |
| 4,481,722 A | * | 11/1984 | Guy et al. | 34/535 |
| 4,481,786 A | * | 11/1984 | Bashark | 62/160 |
| 4,485,566 A | * | 12/1984 | Vivares | 34/547 |
| 4,489,574 A | * | 12/1984 | Spendel | 68/16 |
| 4,516,335 A | * | 5/1985 | Aoki et al. | 34/608 |
| 4,525,937 A | * | 7/1985 | Strandberg et al. | 34/550 |
| 4,531,307 A | * | 7/1985 | Kuecker | 34/552 |
| 4,532,459 A | * | 7/1985 | Erdman et al. | 318/400.2 |
| 4,546,554 A | * | 10/1985 | Bullock et al. | 34/554 |
| 4,549,362 A | * | 10/1985 | Haried | 34/395 |
| 4,621,438 A | * | 11/1986 | Lanciaux | 34/77 |
| 4,622,759 A | * | 11/1986 | Abe et al. | 34/546 |
| 4,640,022 A | * | 2/1987 | Suzuki et al. | 34/552 |
| 4,640,680 A | * | 2/1987 | Schilling | 431/350 |
| 4,642,907 A | * | 2/1987 | Best | 34/552 |
| 4,649,654 A | * | 3/1987 | Hikino et al. | 34/493 |
| 4,689,896 A | * | 9/1987 | Narang | 34/82 |
| 4,738,034 A | * | 4/1988 | Muramatsu et al. | 34/524 |
| 4,762,488 A | * | 8/1988 | Schilling | 431/350 |
| 4,774,821 A | * | 10/1988 | Luppi et al. | 68/18 C |
| 4,788,775 A | * | 12/1988 | Ahmed | 34/552 |
| 4,860,231 A | | 8/1989 | Ballard | 364/571 |
| 4,865,755 A | * | 9/1989 | Lloyd | 510/295 |
| 4,891,892 A | * | 1/1990 | Narang | 34/86 |
| 4,991,313 A | * | 2/1991 | Joslin | 34/555 |
| 5,006,778 A | * | 4/1991 | Bashark | 318/799 |
| 5,029,458 A | * | 7/1991 | Obata et al. | 68/19.2 |
| 5,050,313 A | | 9/1991 | Wakaeya | 34/27 |
| 5,053,157 A | * | 10/1991 | Lloyd | 510/295 |
| 5,097,606 A | * | 3/1992 | Harmelink et al. | 34/467 |
| 5,101,575 A | | 4/1992 | Bashark | 34/53 |
| 5,107,606 A | * | 4/1992 | Tsubaki et al. | 34/596 |
| 5,131,887 A | * | 7/1992 | Traudt | 454/255 |
| 5,166,592 A | * | 11/1992 | Bashark | 318/799 |
| 5,187,879 A | * | 2/1993 | Holst | 34/261 |
| 5,212,969 A | * | 5/1993 | Tsubaki et al. | 68/19.2 |
| 5,267,897 A | * | 12/1993 | Drees | 454/225 |
| 5,281,956 A | * | 1/1994 | Bashark | 340/660 |
| 5,291,667 A | | 3/1994 | Joslin et al. | 34/44 |
| 5,301,438 A | * | 4/1994 | Tanaka et al. | 34/550 |
| 5,301,516 A | * | 4/1994 | Poindexter | 62/126 |
| 5,315,765 A | * | 5/1994 | Holst et al. | 34/260 |
| 5,321,897 A | * | 6/1994 | Holst et al. | 34/260 |
| 5,345,694 A | * | 9/1994 | Hayashi | 34/550 |
| 5,359,945 A | * | 11/1994 | Buckner et al. | 110/233 |
| 5,367,787 A | * | 11/1994 | Ikeda et al. | 34/549 |
| 5,388,348 A | * | 2/1995 | Tanaka et al. | 34/499 |
| 5,443,541 A | | 8/1995 | St. Louis | 34/486 |
| 5,444,924 A | | 8/1995 | Joslin et al. | 34/486 |
| 5,447,414 A | | 9/1995 | Nordby et al. | |
| 5,454,171 A | * | 10/1995 | Ikeda et al. | 34/492 |
| 5,522,327 A | * | 6/1996 | Buckner et al. | 110/233 |
| 5,544,428 A | * | 8/1996 | Kuroda et al. | 34/493 |
| 5,555,645 A | * | 9/1996 | Joslin | 34/499 |
| 5,555,648 A | * | 9/1996 | Griffin | 34/621 |
| 5,560,124 A | * | 10/1996 | Hart et al. | 34/493 |
| 5,619,614 A | * | 4/1997 | Payne et al. | 706/1 |
| 5,647,231 A | * | 7/1997 | Payne et al. | 68/12.01 |
| 5,651,194 A | * | 7/1997 | Hayashi | 34/550 |
| 5,709,040 A | * | 1/1998 | Horwitz | 34/565 |
| 5,722,181 A | * | 3/1998 | Meyer | 34/235 |
| 5,736,823 A | | 4/1998 | Nordby et al. | |
| 5,768,730 A | * | 6/1998 | Matsumoto et al. | 8/159 |
| 5,782,409 A | * | 7/1998 | Paul | 239/56 |
| 5,822,883 A | * | 10/1998 | Horwitz | 34/494 |
| 5,826,128 A | * | 10/1998 | Nishida | 396/572 |
| 5,852,881 A | * | 12/1998 | Kuroda et al. | 34/527 |
| 5,860,224 A | | 1/1999 | Larson | 34/418 |
| 5,860,858 A | * | 1/1999 | Wettergren | 454/343 |
| 5,972,041 A | * | 10/1999 | Smith et al. | 8/142 |
| 5,997,586 A | * | 12/1999 | Smith et al. | 8/142 |
| 6,036,727 A | * | 3/2000 | Smith | 8/142 |
| 6,064,043 A | * | 5/2000 | Livers et al. | 219/492 |
| 6,079,121 A | * | 6/2000 | Khadkikar et al. | 34/528 |
| 6,085,588 A | | 7/2000 | Khadkikar et al. | |
| 6,086,634 A | * | 7/2000 | Smith | 8/142 |
| 6,154,978 A | | 12/2000 | Slutsky | 34/321 |
| 6,158,148 A | | 12/2000 | Krausch | 34/497 |
| 6,179,880 B1 | * | 1/2001 | Smith | 8/142 |
| 6,199,300 B1 | * | 3/2001 | Heater et al. | 34/446 |
| 6,202,649 B1 | * | 3/2001 | Williams | 131/303 |
| 6,233,771 B1 | * | 5/2001 | Hortel et al. | 8/150 |
| 6,238,736 B1 | * | 5/2001 | Smith et al. | 427/242 |
| 6,243,969 B1 | * | 6/2001 | Yeazell | 34/340 |
| 6,254,932 B1 | * | 7/2001 | Smith et al. | 427/242 |
| 6,334,267 B1 | | 1/2002 | Slutsky | |
| 6,373,032 B1 | * | 4/2002 | Bruntz et al. | 219/494 |
| 6,425,401 B1 | * | 7/2002 | Williams | 131/303 |
| 6,575,228 B1 | * | 6/2003 | Ragland et al. | 165/54 |
| 6,637,127 B2 | | 10/2003 | Reede et al. | |
| 6,643,953 B2 | | 11/2003 | Song et al. | 34/604 |
| 6,647,643 B2 | | 11/2003 | Song et al. | 34/595 |

| Patent No. | Date | Name | Class |
|---|---|---|---|
| 6,655,047 B2 * | 12/2003 | Miller, II | 34/544 |
| 6,671,977 B2 | 1/2004 | Beaumont | 34/79 |
| 6,673,121 B2 * | 1/2004 | Mettlach et al. | 8/149.1 |
| 6,691,536 B2 | 2/2004 | Severns et al. | 68/12.27 |
| 6,700,102 B2 * | 3/2004 | St. Louis | 219/511 |
| 6,725,732 B1 * | 4/2004 | Stein | 73/861.55 |
| 6,726,362 B1 * | 4/2004 | Frisch et al. | 383/103 |
| 6,739,069 B2 * | 5/2004 | Prajescu et al. | 34/63 |
| 6,745,495 B1 | 6/2004 | Riddle et al. | 34/497 |
| 6,750,188 B2 * | 6/2004 | Baker et al. | 510/275 |
| 6,751,888 B2 | 6/2004 | Lueckenbach | 34/597 |
| 6,757,988 B2 | 7/2004 | Bruntz et al. | 34/543 |
| 6,770,141 B1 * | 8/2004 | Campbell et al. | 118/667 |
| 6,785,981 B1 | 9/2004 | Harpenau | 34/140 |
| 6,792,694 B2 | 9/2004 | Lapierre | |
| 6,821,042 B2 * | 11/2004 | Baker et al. | 401/38 |
| 6,845,290 B1 * | 1/2005 | Wunderlin et al. | 700/208 |
| 6,857,296 B2 * | 2/2005 | Fagg et al. | 68/235 R |
| 6,866,888 B2 * | 3/2005 | Baker et al. | 427/242 |
| 6,880,255 B2 * | 4/2005 | Collier | 211/85.7 |
| 6,898,951 B2 * | 5/2005 | Severns et al. | 68/5 C |
| 6,904,703 B2 * | 6/2005 | Naganawa et al. | 34/596 |
| 6,907,680 B2 * | 6/2005 | Mariotti | 34/486 |
| 6,931,759 B2 | 8/2005 | Jeong et al. | 34/485 |
| 6,968,632 B2 * | 11/2005 | Guinibert et al. | 34/602 |
| 6,971,186 B1 * | 12/2005 | Chin et al. | 34/82 |
| 6,996,920 B2 * | 2/2006 | Bang et al. | 34/494 |
| 7,013,578 B2 * | 3/2006 | Wunderlin et al. | 34/528 |
| 7,017,280 B2 * | 3/2006 | Green et al. | 34/486 |
| 7,024,795 B2 * | 4/2006 | Tadano et al. | 34/76 |
| 7,040,101 B2 * | 5/2006 | Takeda et al. | 62/78 |
| 7,048,537 B2 * | 5/2006 | Jaeschke et al. | 431/28 |
| 7,055,262 B2 * | 6/2006 | Goldberg et al. | 34/86 |
| 7,059,065 B2 * | 6/2006 | Gerlach et al. | 34/381 |
| 7,065,905 B2 * | 6/2006 | Guinibert et al. | 34/603 |
| 7,066,412 B2 * | 6/2006 | Conley et al. | 239/690 |
| 7,080,464 B1 * | 7/2006 | Tarnowski et al. | 34/493 |
| 7,082,695 B1 * | 8/2006 | Wong et al. | 34/486 |
| 7,117,613 B2 * | 10/2006 | Guinibert et al. | 34/534 |
| 7,127,832 B2 * | 10/2006 | Park et al. | 34/562 |
| 7,146,749 B2 * | 12/2006 | Barron et al. | 34/596 |
| 7,178,264 B2 * | 2/2007 | Kim | 34/596 |
| 7,178,265 B2 * | 2/2007 | Ford | 34/601 |
| 7,191,546 B2 * | 3/2007 | Maruca | 34/201 |
| 7,191,548 B2 * | 3/2007 | Salameh et al. | 34/380 |
| 7,225,562 B2 * | 6/2007 | Guinibert et al. | 34/601 |
| 7,228,647 B2 * | 6/2007 | Hong | 34/596 |
| 7,257,905 B2 * | 8/2007 | Guinibert et al. | 34/82 |
| 7,275,400 B2 * | 10/2007 | Severns et al. | 68/18 F |
| 7,312,973 B2 * | 12/2007 | Sekoguchi et al. | 361/231 |
| 7,313,874 B2 * | 1/2008 | Park | 34/493 |
| 7,322,126 B2 * | 1/2008 | Beaulac | 34/554 |
| 7,325,332 B2 * | 2/2008 | Chung et al. | 34/602 |
| 7,340,848 B2 * | 3/2008 | Ford | 34/601 |
| 7,377,052 B2 * | 5/2008 | Maruca | 34/201 |
| 7,409,776 B2 * | 8/2008 | Ono et al. | 34/77 |
| 7,412,783 B2 * | 8/2008 | Guinibert et al. | 34/572 |
| 7,415,781 B2 * | 8/2008 | Barron et al. | 34/595 |
| 7,426,791 B2 * | 9/2008 | Martin | 34/607 |
| 7,467,483 B2 * | 12/2008 | Guinibert et al. | 34/601 |
| 7,469,486 B2 * | 12/2008 | Tamura et al. | 34/77 |
| 7,478,486 B2 * | 1/2009 | Wunderlin et al. | 34/491 |
| 7,506,458 B2 * | 3/2009 | Lee et al. | 34/601 |
| 7,520,145 B2 * | 4/2009 | Hong et al. | 68/12.27 |
| 7,525,262 B2 * | 4/2009 | Carow | 318/59 |
| 7,526,879 B2 * | 5/2009 | Bae et al. | 34/596 |
| 7,543,396 B2 * | 6/2009 | Nishino et al. | 34/606 |
| 7,552,545 B2 * | 6/2009 | Crawford et al. | 34/600 |
| 7,575,773 B2 * | 8/2009 | Ishizuka et al. | 427/58 |
| 7,594,343 B2 * | 9/2009 | Woerdehoff et al. | 34/491 |
| 7,627,960 B2 * | 12/2009 | Beyerle et al. | 34/602 |
| 7,665,226 B2 * | 2/2010 | Tsuruta et al. | 34/259 |
| 7,665,227 B2 * | 2/2010 | Wright et al. | 34/339 |
| 7,735,345 B2 * | 6/2010 | Wright et al. | 68/13 R |
| 7,742,951 B2 * | 6/2010 | Ebrom et al. | 705/26.4 |
| 7,839,275 B2 * | 11/2010 | Spalink et al. | 340/501 |
| 7,870,799 B2 * | 1/2011 | Neumann | 73/865.9 |
| 7,913,418 B2 * | 3/2011 | Carow et al. | 34/499 |
| 7,921,578 B2 * | 4/2011 | McAllister et al. | 34/597 |
| 7,926,311 B2 * | 4/2011 | Mani et al. | 68/19 |
| 2001/0022007 A1 * | 9/2001 | Yeazell | 8/142 |
| 2001/0048030 A1 * | 12/2001 | Sharood et al. | 236/49.3 |
| 2002/0014233 A1 * | 2/2002 | Gatley et al. | 126/110 R |
| 2002/0069599 A1 * | 6/2002 | Dhallan | 52/302.1 |
| 2002/0082188 A1 * | 6/2002 | Baker et al. | 510/475 |
| 2002/0119907 A1 * | 8/2002 | Baker et al. | 510/475 |
| 2002/0133886 A1 * | 9/2002 | Severns et al. | 8/142 |
| 2002/0174874 A1 * | 11/2002 | Williams | 131/300 |
| 2002/0184786 A1 * | 12/2002 | Miller, II | 34/132 |
| 2003/0000106 A1 * | 1/2003 | Anderson et al. | 34/598 |
| 2003/0061728 A1 * | 4/2003 | Reede et al. | 34/526 |
| 2003/0089138 A1 * | 5/2003 | Kawamura et al. | 68/17 R |
| 2003/0097764 A1 * | 5/2003 | St. Louis | 34/524 |
| 2003/0101617 A1 * | 6/2003 | Prajescu et al. | 34/527 |
| 2003/0114331 A1 * | 6/2003 | Baker et al. | 510/276 |
| 2003/0126691 A1 * | 7/2003 | Gerlach et al. | 8/158 |
| 2003/0222038 A1 * | 12/2003 | Collier | 211/85.7 |
| 2003/0230005 A1 * | 12/2003 | Lapierre | 34/606 |
| 2004/0006886 A1 | 1/2004 | Lee et al. | |
| 2004/0007000 A1 * | 1/2004 | Takeda et al. | 62/78 |
| 2004/0010937 A1 * | 1/2004 | Naganawa et al. | 34/595 |
| 2004/0045187 A1 * | 3/2004 | Curry et al. | 34/595 |
| 2004/0060196 A1 * | 4/2004 | Lueckenbach | 34/595 |
| 2004/0067322 A1 * | 4/2004 | Baker et al. | 427/421 |
| 2004/0102350 A1 * | 5/2004 | Baker et al. | 510/405 |
| 2004/0118013 A1 * | 6/2004 | Kohlman et al. | 34/595 |
| 2004/0123488 A1 * | 7/2004 | Han | 34/595 |
| 2004/0129032 A1 * | 7/2004 | Severns et al. | 68/5 C |
| 2004/0143994 A1 * | 7/2004 | Baron et al. | 34/597 |
| 2004/0200093 A1 * | 10/2004 | Wunderlin et al. | 34/606 |
| 2004/0225452 A1 * | 11/2004 | Campbell et al. | 702/22 |
| 2004/0255394 A1 * | 12/2004 | Mani et al. | 8/159 |
| 2005/0044743 A1 * | 3/2005 | Park | 34/544 |
| 2005/0044744 A1 * | 3/2005 | Tadano et al. | 34/596 |
| 2005/0050644 A1 * | 3/2005 | Severns et al. | 8/115.51 |
| 2005/0071929 A1 * | 4/2005 | Mani et al. | 8/158 |
| 2005/0076455 A1 * | 4/2005 | Guinibert et al. | 8/158 |
| 2005/0076535 A1 * | 4/2005 | Guinibert et al. | 34/601 |
| 2005/0109357 A1 * | 5/2005 | Williams | 131/347 |
| 2005/0115104 A1 * | 6/2005 | Guinibert et al. | 34/601 |
| 2005/0125910 A1 * | 6/2005 | Guinibert et al. | 8/158 |
| 2005/0132759 A1 * | 6/2005 | Guinibert et al. | 68/24 |
| 2005/0168907 A1 * | 8/2005 | Sekoguchi et al. | 361/230 |
| 2005/0172511 A1 * | 8/2005 | Cimetta | 34/607 |
| 2005/0183208 A1 * | 8/2005 | Scheper et al. | 8/142 |
| 2005/0198852 A1 * | 9/2005 | Ono et al. | 34/77 |
| 2005/0217138 A1 * | 10/2005 | Kohne et al. | 34/603 |
| 2005/0252028 A1 * | 11/2005 | Park et al. | 34/528 |
| 2005/0252029 A1 * | 11/2005 | Kim | 34/596 |
| 2005/0278974 A1 * | 12/2005 | Chung | 34/528 |
| 2006/0005581 A1 * | 1/2006 | Banba | 68/5 R |
| 2006/0048405 A1 * | 3/2006 | Baek et al. | 34/443 |
| 2006/0078837 A1 * | 4/2006 | Jaeschke et al. | 431/28 |
| 2006/0086000 A1 * | 4/2006 | Lee | 34/524 |
| 2006/0096114 A1 * | 5/2006 | Hong | 34/77 |
| 2006/0107548 A1 * | 5/2006 | Ford | 34/601 |
| 2006/0111816 A1 * | 5/2006 | Spalink et al. | 700/276 |
| 2006/0123652 A1 * | 6/2006 | Chung et al. | 34/92 |
| 2006/0150437 A1 * | 7/2006 | Tarnowski et al. | 34/443 |
| 2006/0152178 A1 * | 7/2006 | Carow | 318/66 |
| 2006/0162182 A1 * | 7/2006 | Wong et al. | 34/486 |
| 2006/0179676 A1 * | 8/2006 | Goldberg et al. | 34/77 |
| 2006/0179681 A1 * | 8/2006 | Tamura et al. | 34/475 |
| 2006/0191161 A1 * | 8/2006 | Wunderlin et al. | 34/562 |
| 2006/0218812 A1 * | 10/2006 | Brown | 34/86 |
| 2006/0242858 A1 * | 11/2006 | Beaulac | 34/446 |
| 2006/0248746 A1 * | 11/2006 | Dittmer et al. | 34/534 |
| 2006/0254083 A1 * | 11/2006 | Ford | 34/601 |
| 2006/0254084 A1 * | 11/2006 | Ford | 34/601 |
| 2006/0288605 A1 * | 12/2006 | Carow et al. | 34/446 |
| 2006/0288608 A1 * | 12/2006 | Carow et al. | 34/604 |
| 2007/0006477 A1 * | 1/2007 | Guinibert et al. | 34/85 |
| 2007/0039198 A1 * | 2/2007 | Boettcher et al. | 34/131 |
| 2007/0094888 A1 * | 5/2007 | Barron et al. | 34/597 |
| 2007/0113421 A1 * | 5/2007 | Uhara et al. | 34/275 |
| 2007/0144035 A1 * | 6/2007 | Choi et al. | 34/524 |
| 2007/0151041 A1 * | 7/2007 | McAllister et al. | 8/149.2 |
| 2007/0151120 A1 * | 7/2007 | Tomasi et al. | 34/601 |

| Publication No. | Date | Inventor | Class |
|---|---|---|---|
| 2007/0151129 A1* | 7/2007 | McAllister et al. | 38/3 |
| 2007/0151310 A1* | 7/2007 | Wright et al. | 68/3 R |
| 2007/0151311 A1* | 7/2007 | McAllister et al. | 68/3 R |
| 2007/0151312 A1* | 7/2007 | Bruce et al. | 68/3 R |
| 2007/0163093 A1* | 7/2007 | Wright et al. | 28/100 |
| 2007/0163094 A1* | 7/2007 | Wright et al. | 28/100 |
| 2007/0163095 A1* | 7/2007 | McAllister et al. | 28/100 |
| 2007/0163096 A1* | 7/2007 | McAllister et al. | 28/100 |
| 2007/0163097 A1* | 7/2007 | Metcalfe et al. | 28/100 |
| 2007/0163098 A1* | 7/2007 | Tomasi et al. | 28/100 |
| 2007/0186440 A1* | 8/2007 | Guinibert et al. | 34/603 |
| 2007/0193279 A1* | 8/2007 | Yoneno et al. | 62/3.3 |
| 2007/0209228 A1* | 9/2007 | Meerpohl et al. | 34/595 |
| 2007/0220683 A1* | 9/2007 | Kim | 8/158 |
| 2007/0220776 A1* | 9/2007 | Guinibert et al. | 34/603 |
| 2007/0251118 A1* | 11/2007 | Doh | 34/528 |
| 2007/0271811 A1* | 11/2007 | Tsuruta et al. | 34/263 |
| 2007/0271814 A1* | 11/2007 | Bae et al. | 34/524 |
| 2007/0288251 A1* | 12/2007 | Ebrom et al. | 705/1 |
| 2007/0288331 A1* | 12/2007 | Ebrom et al. | 705/27 |
| 2007/0298405 A1* | 12/2007 | Ebrom et al. | 434/365 |
| 2008/0034611 A1* | 2/2008 | Carow et al. | 34/565 |
| 2008/0052951 A1* | 3/2008 | Beaulac | 34/549 |
| 2008/0052954 A1* | 3/2008 | Beaulac | 34/572 |
| 2008/0072450 A1* | 3/2008 | Kim et al. | 34/524 |
| 2008/0078100 A1* | 4/2008 | Kim et al. | 34/524 |
| 2008/0100695 A1* | 5/2008 | Ebrom et al. | 348/14.08 |
| 2008/0109243 A1* | 5/2008 | Ebrom et al. | 705/1 |
| 2008/0109310 A1* | 5/2008 | Ebrom et al. | 705/14 |
| 2008/0109311 A1* | 5/2008 | Ebrom et al. | 705/14 |
| 2008/0109312 A1* | 5/2008 | Ebrom et al. | 705/14 |
| 2008/0110041 A1* | 5/2008 | Ehlers | 34/487 |
| 2008/0110044 A1* | 5/2008 | Ehlers | 34/524 |
| 2008/0120868 A1* | 5/2008 | Morrison et al. | 34/572 |
| 2008/0124667 A1* | 5/2008 | Schultz | 431/18 |
| 2008/0124668 A1* | 5/2008 | Schultz et al. | 431/89 |
| 2008/0131830 A1* | 6/2008 | Nix | 432/220 |
| 2008/0141558 A1* | 6/2008 | Bae et al. | 34/595 |
| 2008/0148597 A1* | 6/2008 | Kim et al. | 34/524 |
| 2008/0189978 A1* | 8/2008 | Aizpuru Borda et al. | 34/549 |
| 2008/0196267 A1* | 8/2008 | Park et al. | 34/443 |
| 2008/0223084 A1* | 9/2008 | Kuwabara | 68/20 |
| 2008/0235977 A1* | 10/2008 | Kuwabara | 34/77 |
| 2008/0245087 A1* | 10/2008 | Orcutt | 62/238.7 |
| 2008/0313923 A1* | 12/2008 | Oh et al. | 34/524 |
| 2009/0000142 A1* | 1/2009 | Churchill et al. | 34/95 |
| 2009/0006970 A1* | 1/2009 | Jeffery et al. | 715/733 |
| 2009/0028214 A1* | 1/2009 | Bache et al. | 374/183 |
| 2009/0044422 A1* | 2/2009 | Moschuetz et al. | 34/544 |
| 2009/0049709 A1* | 2/2009 | Doh | 34/524 |
| 2009/0056385 A1* | 3/2009 | Maekawa | 68/12.16 |
| 2009/0064531 A1* | 3/2009 | Moon et al. | 34/491 |
| 2009/0071032 A1* | 3/2009 | Kreutzfeldt et al. | 34/389 |
| 2009/0100702 A1* | 4/2009 | Fair | 34/487 |
| 2009/0119944 A1* | 5/2009 | Lee et al. | 34/524 |
| 2009/0133283 A1* | 5/2009 | Ricklefs et al. | 34/476 |
| 2009/0139107 A1* | 6/2009 | Grunert et al. | 34/86 |
| 2009/0172969 A1* | 7/2009 | Kim | 34/491 |
| 2009/0178211 A1* | 7/2009 | Wahl et al. | 8/441 |
| 2009/0178212 A1* | 7/2009 | Wahl et al. | 8/441 |
| 2009/0183386 A1* | 7/2009 | Freese et al. | 34/551 |
| 2009/0188660 A1* | 7/2009 | Steffens | 165/253 |
| 2009/0211109 A1* | 8/2009 | Choi et al. | 34/491 |
| 2009/0211111 A1* | 8/2009 | Kim et al. | 34/526 |
| 2009/0214992 A1* | 8/2009 | McKnight et al. | 431/12 |
| 2009/0223467 A1* | 9/2009 | McKnight et al. | 123/23 |
| 2009/0223612 A1* | 9/2009 | McKnight et al. | 149/21 |
| 2009/0255142 A1* | 10/2009 | Brown | 34/79 |
| 2009/0274985 A1* | 11/2009 | McKnight et al. | 431/36 |
| 2009/0282695 A1* | 11/2009 | Kreutzfeldt et al. | 34/443 |
| 2009/0313848 A1* | 12/2009 | Moschutz et al. | 34/524 |
| 2010/0000112 A1* | 1/2010 | Carow et al. | 34/357 |
| 2010/0000114 A1* | 1/2010 | Dalton et al. | 34/389 |
| 2010/0018262 A1* | 1/2010 | Beihoff et al. | 68/5 |
| 2010/0024243 A1* | 2/2010 | Ricklefs et al. | 34/474 |
| 2010/0045472 A1* | 2/2010 | Siddall | 340/626 |
| 2010/0050464 A1* | 3/2010 | Krzelowski et al. | 34/380 |
| 2010/0055629 A1* | 3/2010 | McKnight et al. | 431/12 |
| 2010/0058611 A1* | 3/2010 | Neumann | 34/487 |
| 2010/0106332 A1* | 4/2010 | Chassin et al. | 700/278 |
| 2010/0106641 A1* | 4/2010 | Chassin et al. | 705/40 |
| 2010/0107173 A1* | 4/2010 | Chassin | 718/104 |
| 2010/0114387 A1* | 5/2010 | Chassin | 700/286 |
| 2010/0115785 A1* | 5/2010 | Ben-Shmuel et al. | 34/260 |
| 2010/0186176 A1* | 7/2010 | Wright et al. | 8/137 |
| 2010/0205819 A1* | 8/2010 | Ashrafzadeh et al. | 34/380 |
| 2010/0205820 A1* | 8/2010 | Ashrafzadeh et al. | 34/389 |
| 2010/0205823 A1* | 8/2010 | Ashrafzadeh et al. | 34/445 |
| 2010/0205824 A1* | 8/2010 | Ashrafzadeh et al. | 34/446 |
| 2010/0205825 A1* | 8/2010 | Ashrafzadeh et al. | 34/486 |
| 2010/0205826 A1* | 8/2010 | Ashrafzadeh et al. | 34/499 |
| 2010/0293804 A1* | 11/2010 | Nawrot et al. | 34/86 |
| 2011/0016928 A1* | 1/2011 | Beihoff et al. | 68/19 |
| 2011/0081586 A1* | 4/2011 | McAlister | 429/422 |
| 2011/0083338 A1* | 4/2011 | Carow et al. | 34/329 |
| 2011/0099834 A1* | 5/2011 | Brown | 34/132 |

FOREIGN PATENT DOCUMENTS

| | | |
|---|---|---|
| DE | 4432489 A1 * | 3/1996 |
| DE | 19613 310 A1 | 10/1996 |
| DE | 19755916 A1 * | 6/1999 |
| DE | 19842644 A1 * | 3/2000 |
| EP | 0351276 A1 | 1/1990 |
| EP | 436374 A2 * | 7/1991 |
| EP | 436375 A2 * | 7/1991 |
| EP | 452678 A2 * | 10/1991 |
| EP | 0512940 A1 | 11/1992 |
| EP | 693662 A1 * | 1/1996 |
| EP | 915199 A1 * | 5/1999 |
| EP | 0997571 A3 | 5/2000 |
| EP | 1420104 A1 * | 5/2004 |
| EP | 1516953 A1 * | 3/2005 |
| EP | 1736592 A2 * | 12/2006 |
| EP | 1865104 A1 * | 12/2007 |
| GB | 2079911 A * | 1/1982 |
| GB | 2210485 A | 6/1989 |
| GB | 2279448 | 1/1995 |
| JP | 52011470 A * | 1/1977 |
| JP | 54084655 A * | 7/1979 |
| JP | 54106960 A * | 8/1979 |
| JP | 02109596 A * | 4/1990 |
| JP | 02305599 A * | 12/1990 |
| JP | 04039000 A * | 2/1992 |
| JP | 04099597 A * | 3/1992 |
| JP | 04099599 A * | 3/1992 |
| JP | 4-193298 | 7/1992 |
| JP | 06347428 A * | 12/1994 |
| JP | 07265596 A * | 10/1995 |
| JP | 08024497 A * | 1/1996 |
| JP | 08141289 A * | 6/1996 |
| JP | 09217941 A * | 8/1997 |
| JP | 10076100 A * | 3/1998 |
| JP | 2000051590 A * | 2/2000 |
| JP | 2000130820 A * | 5/2000 |
| JP | 3-178699 | 8/2001 |
| JP | 2001340699 A * | 12/2001 |
| JP | 2002022202 A * | 1/2002 |
| JP | 2002035491 A * | 2/2002 |
| JP | 2002181374 A * | 6/2002 |
| JP | 2003305371 A * | 10/2003 |
| JP | 2005069539 A * | 3/2005 |
| JP | 2005103179 A * | 4/2005 |
| JP | 2007082586 A * | 4/2007 |
| JP | 2007082863 A * | 4/2007 |
| JP | 2007300945 A * | 11/2007 |
| JP | 2008104625 A * | 5/2008 |
| JP | 2008301940 A * | 12/2008 |
| JP | 2009028112 A * | 2/2009 |
| JP | 2009034409 A * | 2/2009 |
| JP | 2009050429 A * | 3/2009 |
| WO | WO 0047810 A1 * | 8/2000 |
| WO | WO 2004048673 A2 * | 6/2004 |
| WO | WO 2005040483 A1 * | 5/2005 |
| WO | WO 2006114340 A1 * | 11/2006 |

* cited by examiner

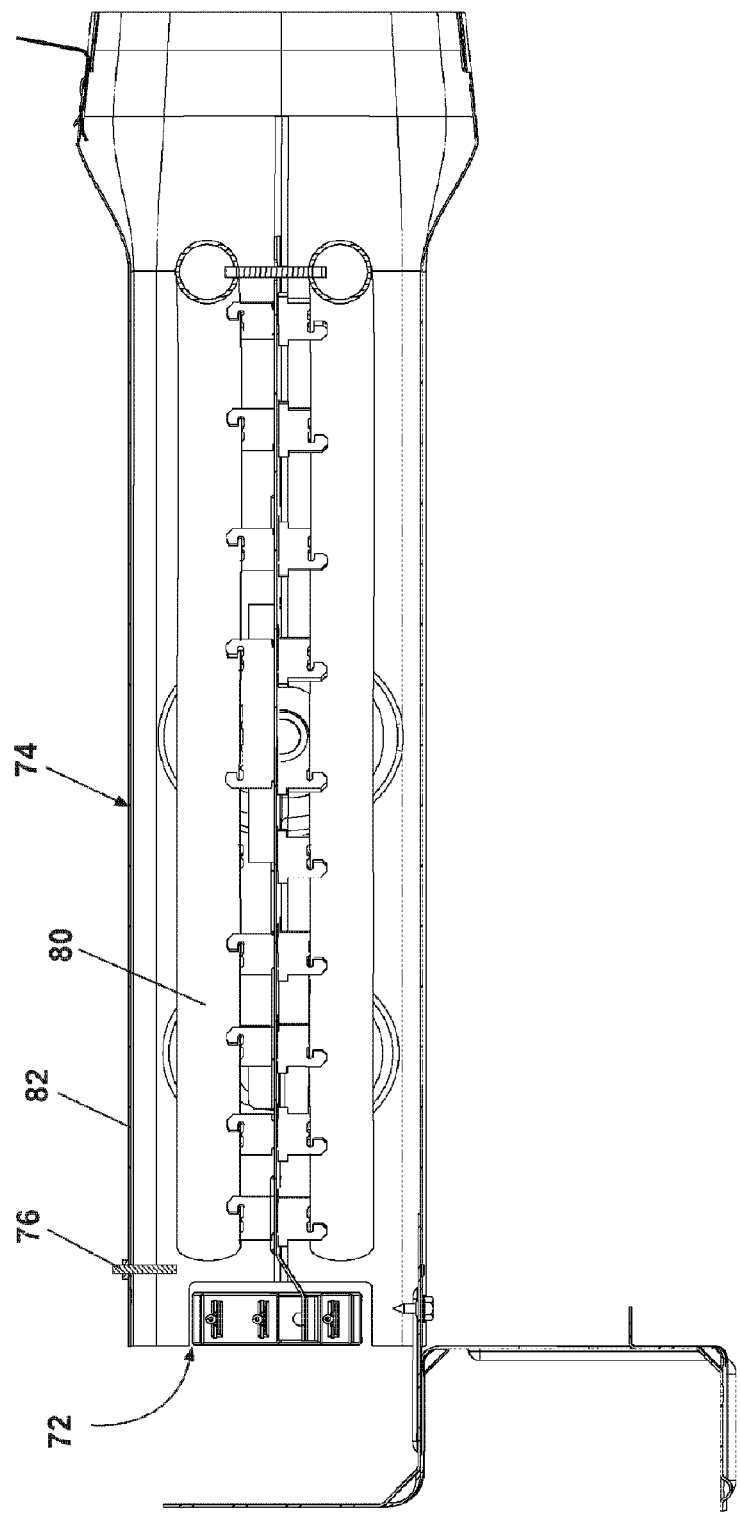

AUTOMATIC CLOTHES DRYER

CROSS-REFERENCE TO RELATED APPLICATION

This application is a continuation-in-part of U.S. application Ser. No. 11/160,433, filed Jun. 23, 2005, which is incorporated herein by reference.

FIELD OF THE INVENTION

The invention relates generally to automatic clothes dryers. In one aspect, the invention relates to a sensor assembly for an automatic clothes dryer which is initially operated for a preselected time prior to initiation of a drying cycle. The sensor output is evaluated to determine whether the dryer is set up and operating properly. The results are available to a consumer as a visual output or stored for later retrieval by a service technician.

DESCRIPTION OF THE RELATED ART

Automatic clothes dryers are well known, and typically comprise a cabinet enclosing a horizontally rotating drum accessible through an access door at the front of the cabinet for holding clothing items to be dried. Rotation of the drum is driven by a motor. The motor can also drive a blower or fan which delivers dry, heated or unheated air to the drum for drying the clothing items. Alternatively, the blower can be driven by a separate motor. A heater is typically positioned in an air inlet assembly upstream of the drum for heating the drying air prior to its entry into the drum. The blower exhausts humid air from the drum through an exhaust outlet assembly to a discharge location exterior of the cabinet. Typically, the exhaust outlet assembly comprises a flexible conduit fabricated of wire-reinforced plastic or segmented metal installed between the cabinet and the discharge location.

Efficient, economical operation of the dryer and drying of the clothing items requires unobstructed airflow through the drum and the exhaust outlet assembly. During installation of the dryer, particularly a consumer self-installation, the flexible conduit can become twisted, kinked, or obstructed so that the air flow therethrough is impeded. The user may also fail to clean the lint trap sufficiently, and lint may accumulate in the exhaust outlet assembly, particularly the flexible conduit. Finally, the air inlet can also become obstructed over time through the accumulation of dust and lint. These conditions can remain unrecognized or easily ignored by the user. Any of these conditions can reduce the airflow through the dryer, adversely affecting the drying of the clothing items, increasing the cost of operating the dryer, and increasing the potential for overheating and fire or premature failure of the dryer.

It would be desirable to have a dryer that can consistently and accurately evaluate the airflow conditions therethrough, alert the user that an undesirable condition exists, and provide information to a service technician relating to the condition and its correction.

SUMMARY OF THE INVENTION

A clothes dryer comprises a rotating drum defining a clothes drying chamber, an air system for supplying air to the clothes drying chamber and exhausting air from the clothes drying chamber, a motorized blower for moving air from an inlet to the drying chamber, through the clothes drying chamber, and through an exhaust inlet, and a heater for heating the air. A method of operating the clothes dryer comprises determining a supply air flow parameter representative of the flow rate of the air supplied to the clothes drying chamber, determining an exhaust air flow parameter representative of the flow rate of the air exhausted from the clothes drying chamber, and determining a condition of the air flow through the air flow system based on the supply air flow parameter and the exhaust air flow parameter.

In another embodiment, the method comprises determining a supply air flow parameter representative of the flow rate of the air supplied to the clothes drying chamber and determining a condition of the air flow through the air flow system based on the supply air flow parameter and the exhaust air flow parameter. The determining of a condition of the air flow can comprise comparing the supply air flow rate to a predetermined air flow rate and determining a blockage based on the comparison. The determining of the supply air flow parameter can be determined while the heater is energized or deenergized or both.

BRIEF DESCRIPTION OF THE DRAWINGS

In the drawings:

FIG. 3A is a sectional view of the air heating assembly and temperature sensor of FIG. 3 taken along line 3A-3A.

DESCRIPTION OF AN EMBODIMENT OF THE INVENTION

Figure 1:
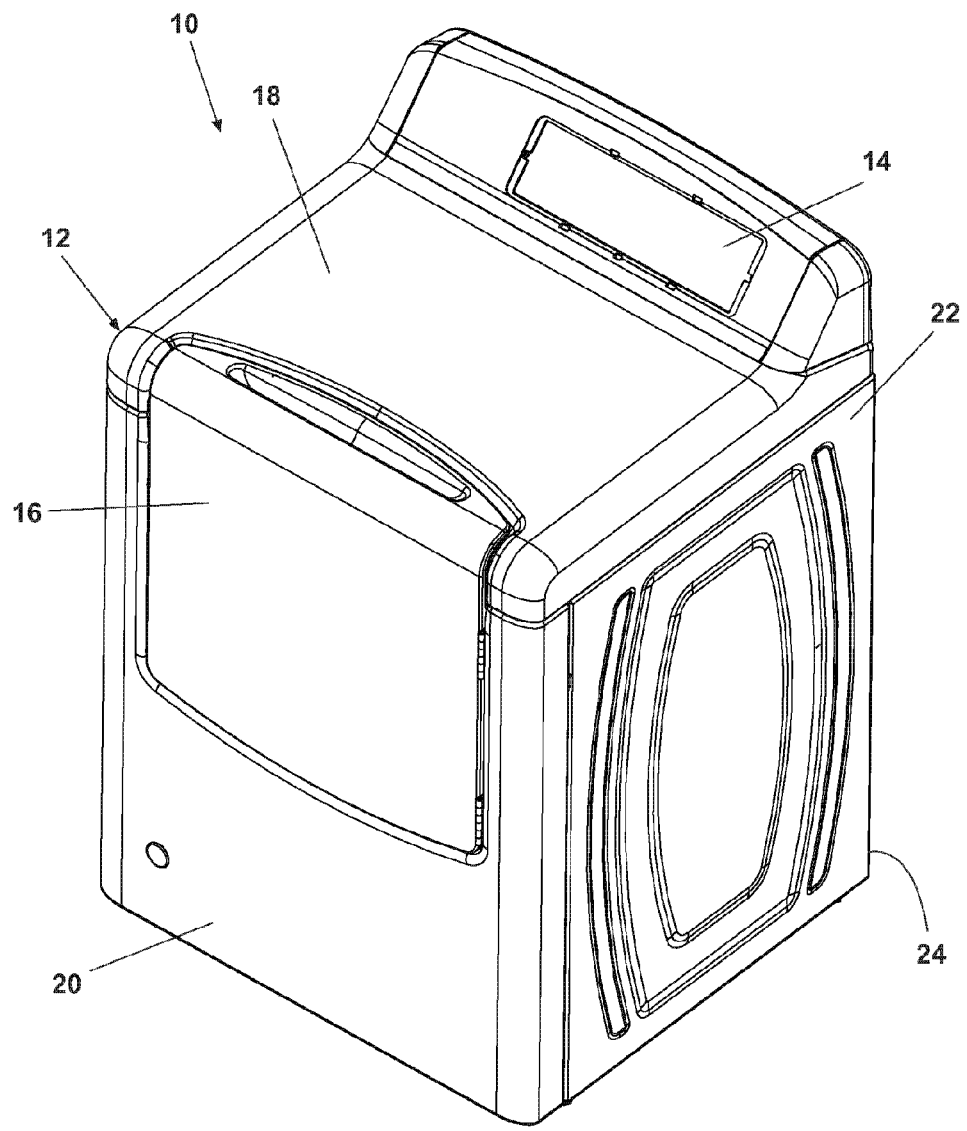
FIG. 1 is a perspective view of an automatic clothes dryer comprising a cabinet enclosing a rotating drum, a blower assembly, and a temperature sensor according to the invention.

Referring to the Figures, and in particular to FIG. 1, an embodiment of an automatic clothes dryer 10 according to the invention is illustrated comprising a cabinet 12 having a control panel 14 for controlling the operation of the dryer 10, a door 16 hingedly attached to a front wall 20 of the cabinet 12, a rear wall 24, and a pair of side walls 22 supporting a top wall 18. The clothes dryer 10 described herein shares many features of a well-known automatic clothes dryer, and will not be described in detail except as necessary for a complete understanding of the invention.

Figure 2:
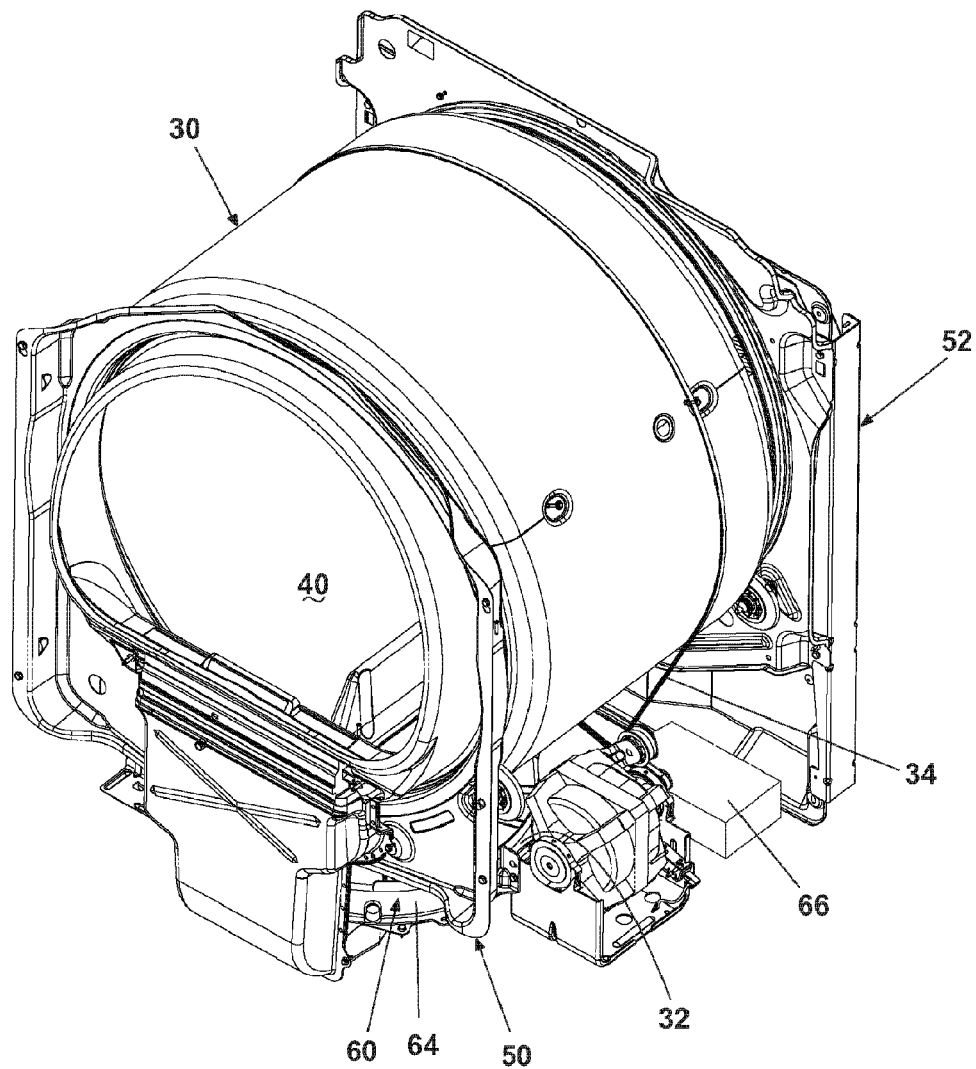
FIG. 2 is a perspective view of the automatic clothes dryer illustrated in FIG. 1 with portions removed for clarity, illustrating the internal components.

FIG. 2 illustrates the dryer 10 with the cabinet 12 removed to disclose the interior of the dryer 10, which comprises a rotating drum 30 rotatably suspended in a well-known manner between a front drum panel 50 and a rear drum panel 52. The front drum panel 50 is provided with an opening for access to the interior of the drum 30 which defines a drying chamber 40. The cabinet 12 also encloses a drum motor assembly 32 adapted in a well-known manner for rotating the drum 30 via a drum belt 34, and a blower assembly 60, which is partially visible beneath the drum 30.

Figure 3:
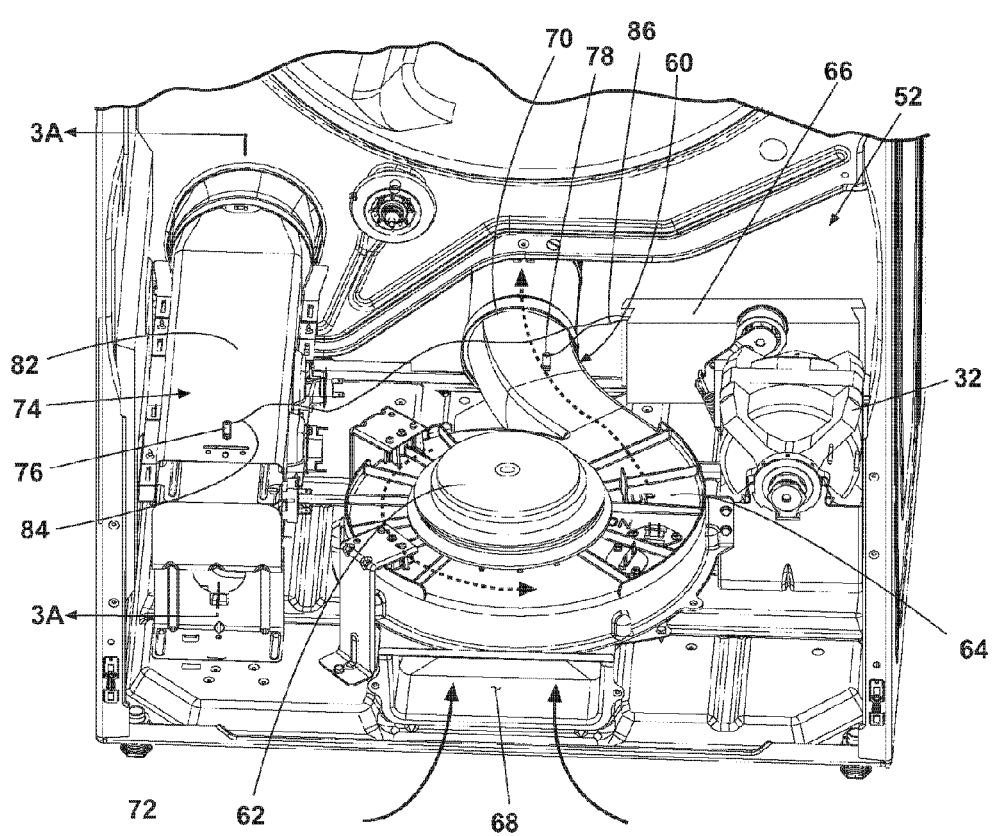
FIG. 3 is a perspective view of the blower assembly, including an air heating assembly and temperature sensors, illustrated in FIG. 2.

The blower assembly 60 is more clearly illustrated in FIG. 3, wherein the drum 30 is removed for clarity. The blower assembly 60 comprises a blower motor 62, a blower 64, and a controller 66. The blower 64 is illustrated as a centrifugal blower comprising a rotating impeller (not shown) enclosed in a housing which is configured to draw in air coaxially and exhaust the air tangentially in a direction orthogonal to the direction of air flow through the impeller. However, other blower types can be employed. Furthermore, the drum motor assembly 32 can be adapted to drive both the blower 64 and the drum 30, thereby eliminating the blower motor 62.

After passing through the drying chamber 40, air is drawn into the blower 64 through a blower inlet 68, as illustrated by the solid line flow vectors, and through the blower housing, as illustrated by the dotted line flow vectors, to exit a blower outlet 70 which is fluidly attached to a flexible dryer vent hose or similar conduit (not shown). Air entering the drying chamber 40 first passes through a dryer air inlet 72 entering into a heater assembly 74 for heating air prior to its entry into the drying chamber 40. The heater assembly 74 is fluidly connected to the drying chamber 40 through suitable inlet and outlet opening in the rear drum panel 52 and a connecting passageway. Thus, air is drawn through the inlet 72 into the heater assembly 74, and on into the drying chamber 40 by the blower assembly 60. The air then passes out of the drying chamber 40 through a passageway (not shown) in the front drum panel 50, through the blower assembly 60 to be exhausted through the dryer vent hose.

The heater assembly 74 is adapted for mounting of a conventional temperature sensor 76, such as a thermistor, for monitoring the temperature at a selected location within the heater assembly 74. In the embodiment described herein, the temperature sensor output is utilized to generate digital data that is proportional to the temperature.

Referring to both FIGS. 3 and 3A, the temperature sensor 76 is illustrated as mounted in a top wall 82 of the heater assembly 74 intermediate the inlet 72 and a heating element 80, i.e. upstream of the heating element 80. Alternatively, the temperature sensor 76 can be mounted downstream of the heating element 80, or in one of the other heater assembly walls. The mounting location of the temperature sensor 76 is selected in order to accurately sense the change in temperature during heating of the heating element 80 and the flow of air through the heater assembly 74.

A second temperature sensor 78 is similarly mounted in the blower assembly 60 intermediate the blower 64 and the blower outlet 70. Electrical leads 84, 86 from each sensor 76, 78, respectively, are connected to the controller 66. The controller 66 comprises a well-known control device, such as a microprocessor, digital memory for storing data from the temperature sensors 76, 78, and interfaces for suitable communication devices, such as displays, alarms, keypads, and the like.

The temperature sensors 76, 78 are utilized to determine air flow through the clothes dryer 10. The output from the temperature sensor 76 is utilized to determine air flow upstream of the drying chamber 40 in order to evaluate whether a blockage exists somewhere in the air flow path, such as the lint trap or exhaust hose. The output from the temperature sensor 78 in conjunction with blower motor data is utilized to determine air flow downstream of the drying chamber 40, and with the information provided from the upstream temperature sensor 76 is utilized to determine air leakage into the dryer 10, such as through seals or around the access door 16.

The airflow estimated from the temperature sensor output represents a volumetric flow rate in scfm units at the entrance to the heater assembly 74. To determine the air flow upstream of the drying chamber 40, prior to the initiation of a drying cycle, the heating element 80 is operated at maximum output, and a series of measurements of the output from the temperature sensor 76 is taken. In the embodiment described herein, measurements from the temperature sensor 76 are taken at one second intervals for a period of 30 seconds, and utilized in an method to calculate the air flow upstream of the drying chamber 40. With a typical thermistor, the output from the thermistor will be an analog voltage which varies inversely with temperature. In the embodiment described herein, the processing of the output is completed in a computer-based controller. The analog output signal from the thermistor is converted in the controller to digital data, which is stored in a conventional memory.

The stored data is processed in a buffer memory, and used, along with preselected coefficients, in an air flow method to calculate the flow value through the dryer. The following describes the methodology for determining the air flow value. The determination of an air flow value is performed electronically in the computer-based controller 66. However, for illustration purposes, the determination of the air flow value is described and illustrated with respect to graphical representations of the methodology.

The following air flow method having the general form of a polynomial equation is utilized to determine air flow from the output of the temperature sensor 76. The data for the parameters to the equation are gathered when the heater is on, which can be referred to as a heating portion of the cycle or a heating phase. Preferably, the data for the parameters is gathered at the first or initial ON cycle of the heater.

$$\text{Flow} = a + b_1 * AD_{start} + \ldots + b_m * AD^n_{start} + c_1 * \text{Inflection}_{slope} + \ldots + c_m * \text{Inflection}^n_{slope} + d_1 * AD_{diff} + \ldots + d_m * AD^n_{diff}$$

where

Flow=volumetric flow rate, scfm;

$\text{Inflection}_{slope}$=the minimum AD difference from the inlet temperature sensor calculated using an overlapping scheme with 1 second sampling rate (for filtering purposes) during the heating portion, counts per second;

$AD_{max}$=the AD value of the maximum inlet temperature sensor reading sampled during the initiation of the air flow detection routine, counts;

$AD_{start}$=the AD value of the inlet temperature sensor just before the heating element is turned on, counts;

$AD_{diff}$=the difference between $AD_{start}$ and $AD_{max} = AD_{max} - AD_{start}$, counts.

"AD" refers to temperature sensor output data converted from an analog voltage into digital form for purposes of the embodiment described herein. It is a dimensionless value, and is processed in terms of counts. The air flow method could be structured to utilize analog data, with appropriate modifications to the coefficients $a_0$-$a_6$. In either case, the methodology described herein would remain essentially the same.

The coefficients a-$d_m$ are machine specific, and dependent upon a particular combination of factors such as the blower, drying chamber, inlet and outlet air passageways, heater, and the like. The coefficients are developed from experimental characterization, and a well-known regression analysis of flow versus temperature data for a particular dryer configuration. Variations in dryer configuration, air flow capacity, heating element characteristics such as electric versus gas, and the like, will give rise to different coefficient values, which must be determined empirically for each dryer configuration. The optimum combination of parameters and coefficient values to use to derive acceptable airflow estimation can be determined on a case-by-case basis and include an assessment of the tradeoffs between accuracy and practical considerations of implementation in the controller.

Figure 4:
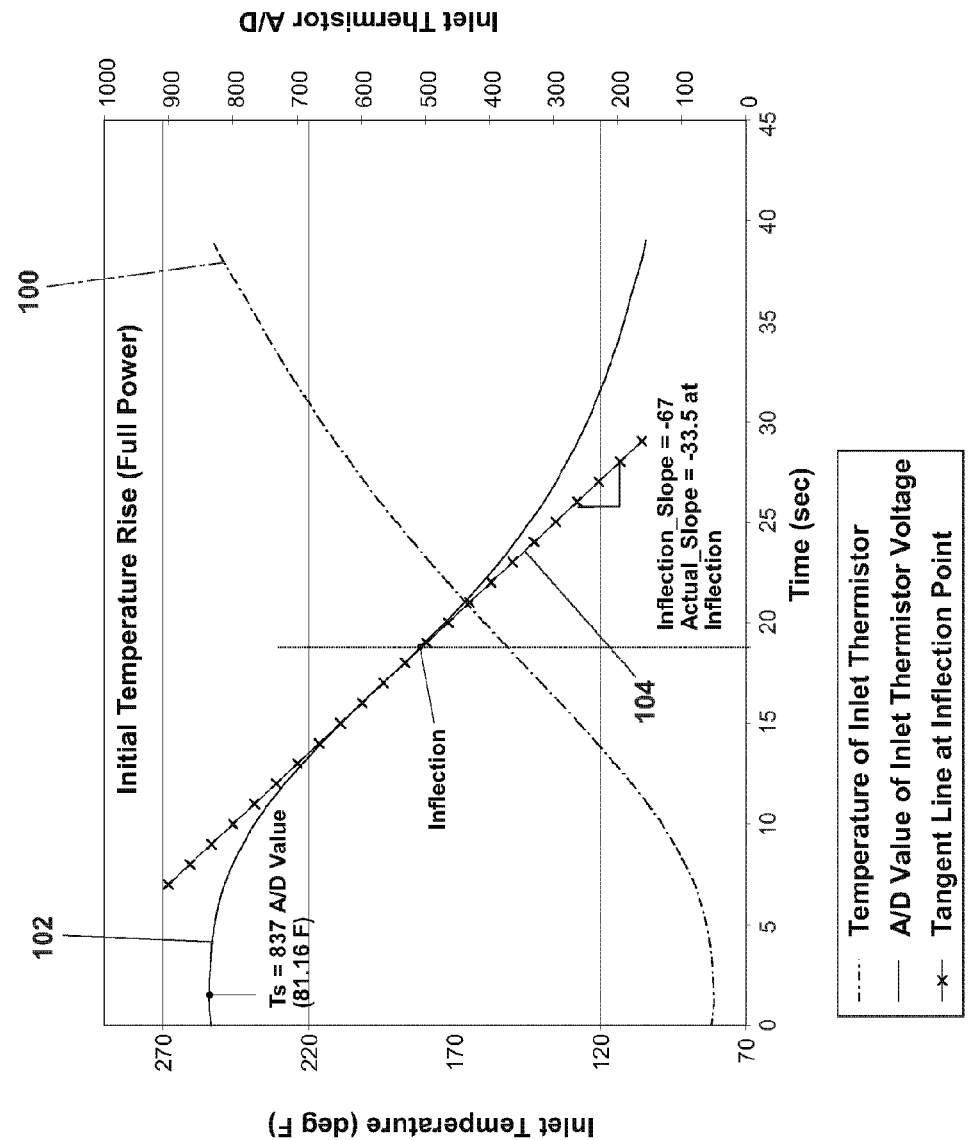
FIG. 4 is a graphical representation of temperature change and temperature sensor output over time from a temperature sensor such as illustrated in FIG. 3.

FIG. 4 illustrates the temperature rise experienced by the temperature sensor 76 as a result of operating the heating element 80 at full power. The temperature sensor 76 in this illustration is a conventional thermistor providing a voltage output which varies inversely with the change in temperature. The temperature curve 100 illustrates that the temperature rises from an initial value of 82° F. to a value after 39 seconds of 254° F. The temperature sensor output curve 102 indicates corresponding AD values for the temperature sensor 76 as 862 and 161, respectively. The initial AD value of 862 is equal to $AD_{start}$. The temperature sensor output curve 102 is initially concave downwardly, but transitions to a concave upwardly portion through an inflection point. In FIG. 4, this inflection point occurs at 19 seconds. A tangent line 104 passing through the inflection point has a slope which can be readily determined graphically in a well-known manner, and is equal to −33.5 counts per second.

Figure 5:
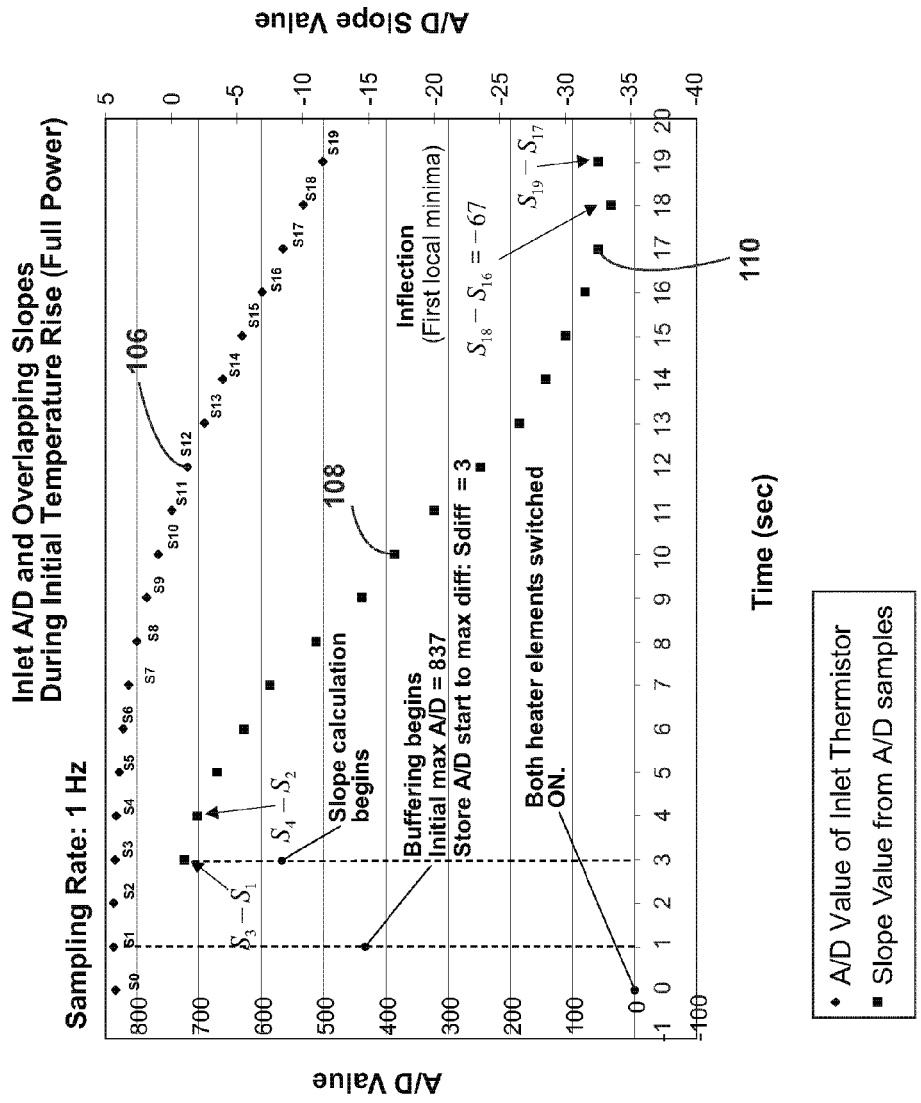
FIG. 5 is a graphical representation of a variation in slope of the temperature sensor output curve of FIG. 4, illustrating the determination of an inflection value corresponding to the steepest slope.

FIG. 5 illustrates the determination of $Inflection_{slope}$ from the temperature sensor data. The determination of $Inflection_{slope}$ can be done using a microprocessor and appropriate software. For purposes of illustration, FIG. 5 illustrates the process graphically.

The output from the temperature sensor 76 is determined at one second intervals, with the start time, t=0 sec corresponding to the heating element being switched on. The temperature sensor output value at the start time is measured, which is identified in FIG. 5 as $s_0$. Temperature sensor output values 106 are determined every second thereafter.

A review of FIGS. 4 and 5 will reveal a slight increase in the output value from the temperature sensor relatively early in the process. This reflects a slight decrease in the temperature of the temperature sensor from the starting temperature value, which is termed $AD_{start}$. In FIGS. 4 and 5, this is illustrated as occurring at about one second. This value is $AD_{max}$, and is a result of air flow over the temperature sensor prior to heating of the heating element 80. The temperature then begins to rise, which is reflected in a decrease in the output value from the temperature sensor.

Beginning with $AD_{max}$, a slope calculation is performed using the output values 106 from the temperature sensor. Digitized data from three consecutive output values from the temperature sensor is stored in a buffer, i.e. first, second, and third values, and the first value is subtracted from the third value. This difference is stored, and the next three consecutive output values from the temperature sensor are stored in the buffer; i.e. the second, third, and fourth values. The second value is subtracted from the fourth value and the difference is again stored. The differences are then compared. This process is repeated until the current difference value is less than the immediately prior difference value, which indicates that the rate of temperature increase is dropping. This is illustrated graphically in FIG. 5.

As illustrated in FIG. 5, slope values 108 are calculated based upon pairs of output values at two-second intervals, rather than one-second intervals, since it has been found that using the two-second intervals has a "filtering" effect which "smooths out" variations in the output values which can occur due to noise, voltage instability fluctuations, and other anomalies. For example, the first slope value, $S_3-S_1$, is calculated from the AD values at three seconds and one second; the second slope value, $S_4-S_2$, is calculated from the AD values at four seconds and two seconds. The process is repeated until a minimum slope value 110 is calculated. This is illustrated as the slope value $S_{18}-S_{16}$, which is equal to −67. Referring again to FIG. 4, this corresponds to the slope of the tangent line 104, which occurs at the inflection point and can be recognized as reflecting a minimum slope for the temperature sensor output curve 102.

The inflection point reflects the point at which the time rate of temperature change in the heater assembly 74 is greatest. If a blockage occurs in the air flow path, the time rate of temperature change would be expected to increase, the time rate of temperature sensor output change would be expected to increase, and the value of $Inflection_{slope}$ would be expected to decrease.

With the values of $AD_{start}$ and $AD_{max}$ determined, $AD_{diff}$ can be calculated. The value of $Inflection_{slope}$ will have been determined from the procedure described above. The air flow method can then be utilized to calculate an air flow value. This calculated air flow value is then compared to a preselected threshold value. Based upon the results of this comparison, a decision is made whether to take corrective action, such as alerting the user, increasing the blower speed, shutting down the dryer, and the like.

The starting temperature, reflected in the temperature sensor output value $AD_{start}$, is significant for its effect on the rate of temperature change. The $AD_{start}$ value is reflective in part of the ambient temperature conditions of the dryer and in part of the temperature state of the dryer components. If the air flow determination described above is initiated immediately after a drying cycle, when the temperature of the dryer components are still elevated, the air flow method must accommodate this difference in temperature conditions from the dryer in an unheated condition. This is accomplished through the utilization of $AD_{start}$.

Additional accuracy in the air flow estimation can be gained, if desired, by using temperature data when the heater element 80 is OFF. For example, air temperatures during the cooling of the heating element 80 after it is turned off can be used alone or in combination with the air temperature data when the heating element 80 is ON. In such a situation, the below equation is used in place of the prior equation. The below equation uses data from both a heating and cooling portion of the cycle:

$$Flow = a + b_1*AD_{start} + \ldots + b_m*AD^n{}_{start} + c_1*Inflection_{slope} + \ldots + c_m*Inflection^n{}_{slope} + d_1*AD_{diff} + \ldots + d_m*AD^n{}_{diff} + e_1*AD_{start2} + \ldots + e_m*AD^n{}_{start2} + f_1*Inflection_{slope2} + \ldots + f_m*Inflection^n{}_{slope2}$$

Where:

$AD_{ambient}$=the AD value of a temperature sensor stored while the dryer is in a stand-by mode;

$AD_{start2}$=the AD value of the inlet temperature sensor, at the beginning of the cooling portion, just as the heating element is turned off, counts;

$Inflection_{slope2}$=the maximum AD difference from the inlet temperature sensor calculated using an overlapping scheme with 1 second sampling rate (for filtering purposes) during the cooling portion, counts per second.

As for the heating portion equation, the coefficients $e-f_m$ are machine specific and can be anecdotally determined in the same manner.

Similarly, the determination of $Inflection_{slope2}$ is accomplished in substantially the same way as description for $Inflection_{slope}$ except the temperatures will be decreasing and the AD output will be increasing.

It is contemplated that the use of the combined heating and cooling portion data will be obtained from one ON/OFF cycle of the heating element 80, preferably the first on/off cycle of the heating element 80. One approach is to follow an initial 30 second heating portion with a cooling portion where the heating element 80 is cycled off and the sampling process is repeated in the same manner as for the heating portion for a period of 20-30 seconds.

The airflow estimate can further be improved in situations of a wide range of ambient temperatures by utilizing a stored value of the temperature sensor AD ($AD_{ambient}$) representative of the temperature sensed while the dryer is in stand-by mode. As implemented, the parameter is not updated while running the drying cycle, and for some period of time past the end of the cycle, to allow the parameter to converge towards the temperature of the dryer's environment.

The decision whether to use the temperature data when the heating element 80 is off can be made based on parameters from when the heating element 80 is on. Use of the temperature data when the heating element 80 is off will be referred to as the cooling phase data.

Figure 6:
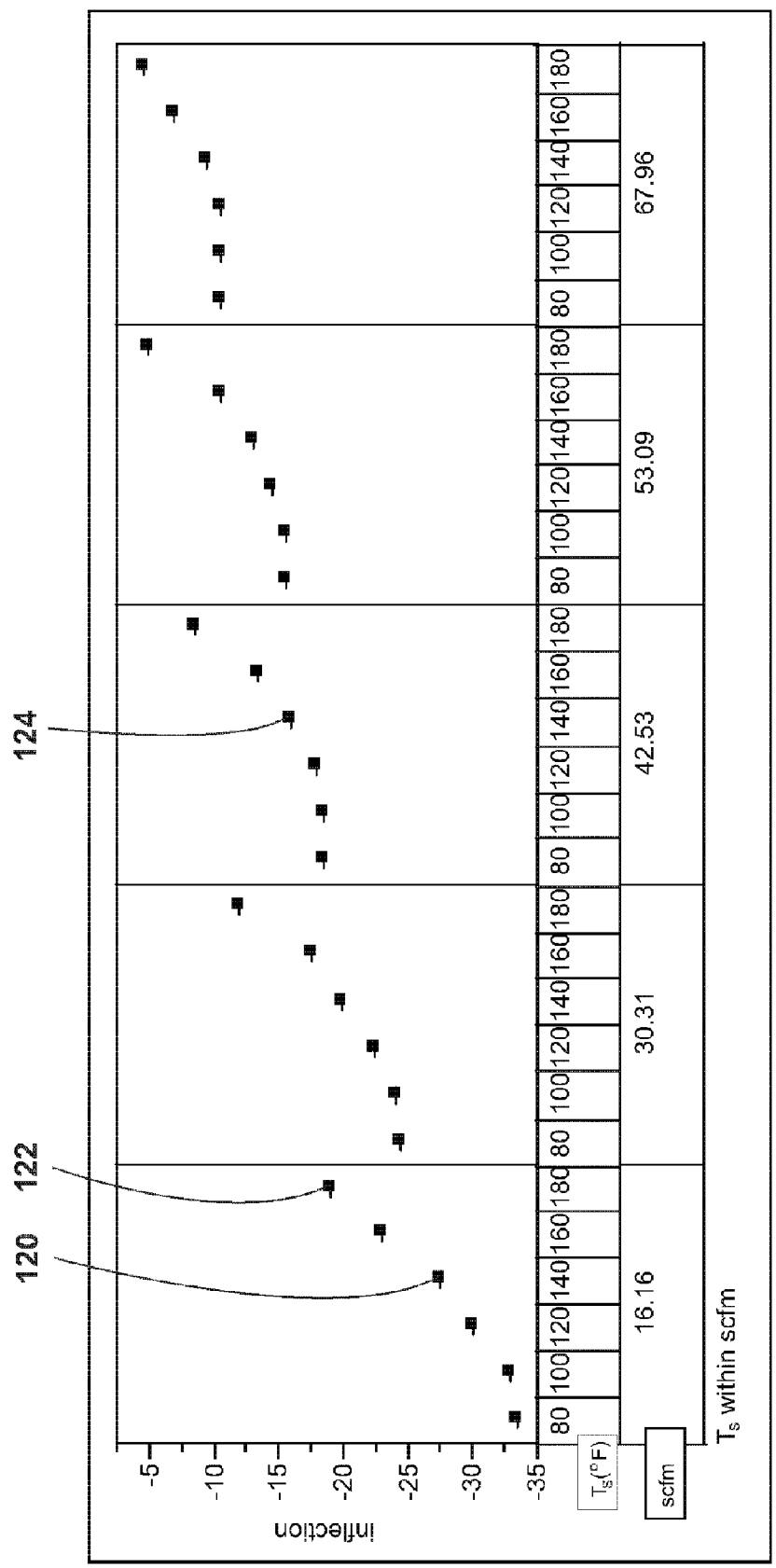
FIG. 6 is a graphical representation of the relationship between starting temperature and air flow on the inflection value for the dryer of FIGS. 1-5.
Figure 7:
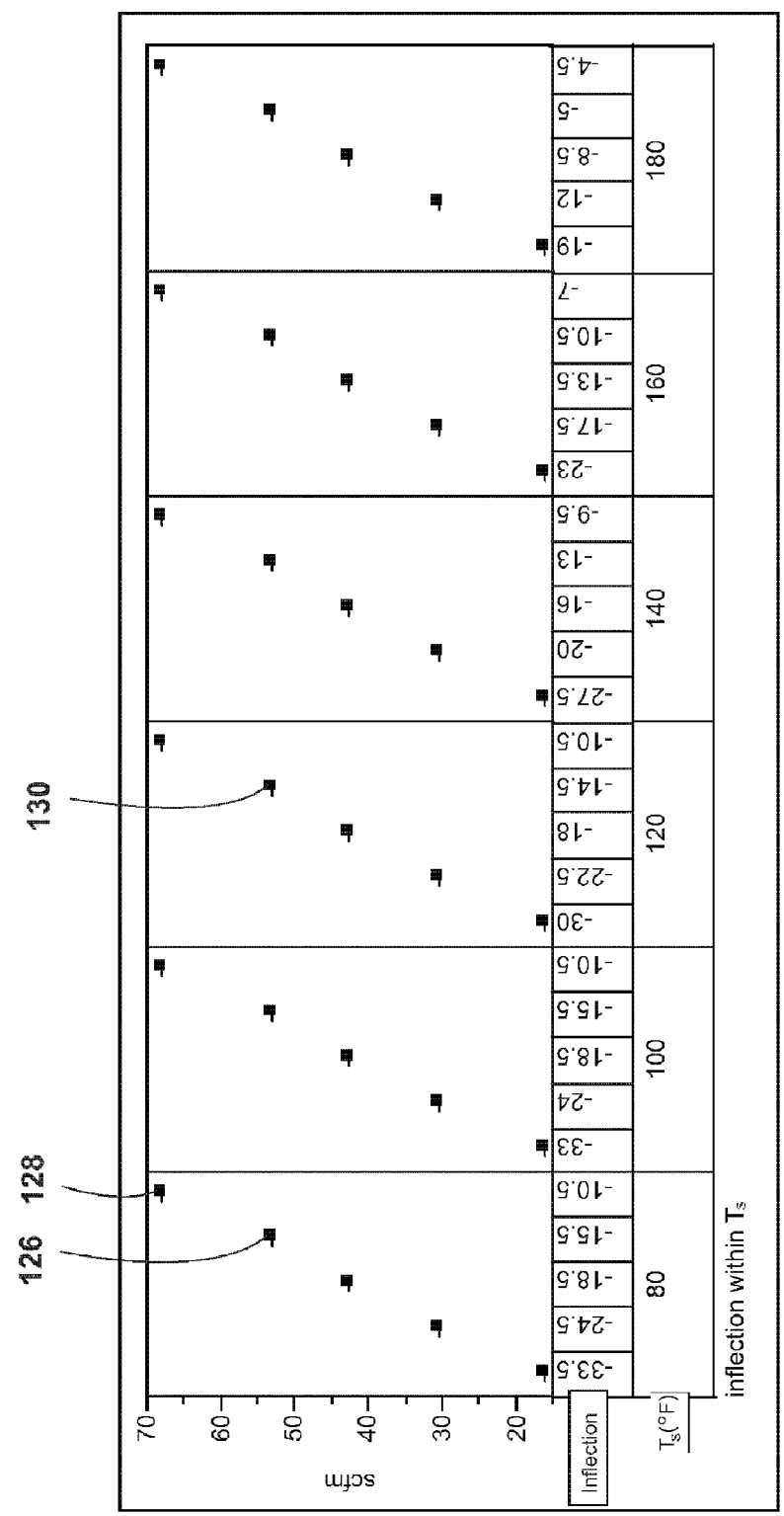
FIG. 7 is a graphical representation of the relationship between starting temperature and inflection value on a calculated air flow through the dryer of FIGS. 1-5.

FIGS. 6 and 7 illustrate the effect of an initial elevated temperature on inflection. FIG. 6 illustrates the change in inflection for starting temperatures, $T_s$, ranging from 80° F. to 180° F. and airflow rates ranging from 16.16 to 67.96 cfm. At starting temperatures of 140° F. and 180° F., for an airflow rate of 16.16 cfm, the inflection value 120 changes from −25 to an inflection value 122 of −19. At a starting temperature of 140° F., a change in flow rate from 16.16 cfm to 42.53 cfm will result in a change in inflection value 120 from −25 to an inflection value 124 of −17.

FIG. 7 illustrates that at a starting temperature of 80° F., an inflection value of −15.5 will result in an air flow value 126 of 54 cfm, and an inflection value of −10.5 will result in an air flow value 128 of 69 cfm. At a starting temperature of 120° F., an inflection value 130 of −14.5 will also result in an air flow value of 54 cfm. Thus, the same air flow value will be calculated for differing inflection values based upon a difference in starting temperature, which can mask the existence of a blockage if the air flow method does not account for starting temperature.

The difference between the starting temperature and the minimum temperature observed during the routine, as reflected in the calculated value $AD_{diff}$, is also significant for its effect on the rate of temperature change, as it represents additional information as to the thermal state of the dryer. If the air flow determination described above is initiated immediately after a drying cycle, when the temperature of the dryer components are still elevated, the air flow method must accommodate this difference in temperature conditions from the dryer in an unheated condition. A decrease in temperature (increase in AD values) can be observed for some period of time in these conditions which indicates the temperature device and the ambient air temperature are not at equilibrium. This adjustment can be accomplished through the utilization of $AD_{diff}$, $AD_{max}$, or $AD_{ambient}$.

Detection of air leakage into the dryer requires an estimation of the airflow at the exhaust end of the airflow path, downstream of the blower. The airflow estimated represents a volumetric flow rate in scfm units at the exhaust end of the dryer.

The value of the volumetric flow rate downstream of the blower, $Flow_{exhaust}$, is determined from the blower motor operational characteristics and the output from the temperature sensor 78 according to the methodology described and illustrated in U.S. patent application Ser. No. 11/033,658, filed Jan. 12, 2005, entitled "Automatic Clothes Dryer," which is fully incorporated by reference herein. The mass flow rate through the blower is first estimated. The mass flow rate can be determined directly from an air flow sensor, or indirectly from the blower motor speed, and the current delivered to or torque developed by the blower motor.

The mass flow rate is machine specific, and dependent upon a particular combination of factors such as the blower, drying chamber, inlet and outlet air passageways, heater, and the like. The mass flow rate can be developed from experimental characterization, including a well-known regression analysis for a particular dryer configuration. Design and/or software changes to the dryer mechanical and electrical systems will require validation and/or re-characterization of the coefficients. Variations in dryer configuration, air flow capacity, heating element characteristics such as electric versus gas, and the like, will give rise to different coefficient values, which must be determined empirically for each dryer configuration.

The volume flow rate is then calculated from the following relationship:

$$Flow_{exhaust} = \frac{m}{\rho}$$

where the exhaust air density $\rho(lbm/ft^3)$ is estimated by a polynomial curve developed from a regression analysis of the relationship between exhaust air density and temperature (expressed as $AD_{exhaust}$) for a particular dryer configuration. $AD_{exhaust}$ is the value of the AD output from an exhaust thermistor voltage divider.

The leakage volumetric flow rate mixing into the drum and/or blower can be calculated from the following relationship:

$$Leak_{initial} = Flow_{exhaust} - Flow_{inlet}$$

where $Leak_{initial}$=the leakage volume flow rate mixing into the drum and/or blower at the start of a dryer cycle, scfm;

$Flow_{exhaust}$=the exhaust volume flow rate estimated from the above outlet thermistor airflow method, scfm;

$Flow_{inlet}$=the inlet volume flow rate estimated from the above inlet thermistor airflow method, scfm.

Subsequent flow changes made by changing blower motor speeds during the drying cycle effect the $Flow_{inlet}$ estimate obtained by the inlet thermistor airflow method at the beginning of the drying cycle. The $Flow_{inlet}$ estimate can be adjusted by estimating the system leakage after each speed change and calculating a new inlet flow after each re-estimation of exhaust flow in accordance with the following relationship:

$$Leak = Leak_{initial} \cdot \frac{Speed_{current}}{Speed_{initial}}$$

where

Leak=the leakage volume flow rate mixing into the drum and/or blower at any time during the drying cycle, scfm;

$Speed_{current}$=the blower motor speed returned by the machine control unit;

$Speed_{initial}$=the blower motor speed set point at the beginning of the cycle.

The blower motor speed, the motor torque or current data, and the temperature data can be processed and stored by an on-board computer system, which can perform the methods and evaluate the results for purposes of determining the existence of a blockage or leak. The results can be stored for later recovery and use by a service technician, and conveyed through audio and/or visual devices to the user.

The methods described herein enable the evaluation of air flow conditions through an automatic clothes dryer, such as blockages and leakage, with data developed from a simple temperature sensor. This eliminates the need for expensive and complex direct airflow measurement devices, which are costly to install and replace, and can themselves become ineffective if exposed to lint and other suspended particles in the dryer airflow.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of determining an air flow rate in an air flow system of a clothes dryer comprising a rotating drum defining a clothes drying chamber, with the air flow system supplying and exhausting air from the clothes drying chamber, and a heater to heat the air in the air flow system, the method comprising:
   supplying air through the air flow system to define a supply air flow;
   determining a temperature of the supply air flow to define a supply air temperature;
   determining an air flow rate value indicative of the volumetric flow rate of supply air flowing through the air flow system from the supply air temperature; and
   comparing the air flow rate value to a predetermined air flow rate value to determine a condition of the air flow through the air flow system.

2. The method according to claim 1, and further comprising determining an inflection value from a time rate of change of the supply air temperature over a preselected time period.

3. The method according to claim 2, and further comprising determining an initial supply air temperature for determining with the inflection value the air flow rate value.

4. The method according to claim 3, and further comprising determining a minimum supply air temperature for determining with the inflection value the air flow rate value.

5. The method according to claim 4, wherein the supply air temperature is determined during at least one of a heating phase and a cooling phase of the heater.

6. The method according to claim 5, wherein the supply air temperature is determined during both of the heating and cooling phases of the heater.

7. The method according to claim 3, wherein the preselected time period occurs at the initiation of a drying cycle.

8. The method according to claim 3, and further comprising determining the supply air temperature at regular time intervals.

9. The method according to claim 1, wherein the comparing the air flow rate value to a predetermined air flow rate value comprises determining the presence of a flow restriction in the air flow system.

10. The method according to claim 9, wherein the determining of the presence of a flow restriction comprises the determining of at least a partial blockage in the air flow system.

11. The method according to claim 1, wherein the determining of the supply air temperature is determined while the heater is one of energized or deenergized.

12. The method according to claim 11, wherein the determining of the supply air temperature is determined while the heater is both energized and deenergized.

13. A method of operating a clothes dryer comprising a rotating drum defining a clothes drying chamber, an air flow system that supplies air to the clothes drying chamber and exhausting air from the clothes drying chamber, a motorized blower that moves air from an inlet to the drying chamber, through the clothes drying chamber, and through an exhaust inlet, and a heater to heat the air, the method comprising:
   supplying air through the air flow system to the clothes drying chamber to define a supply air flow;
   exhausting air through the air flow system from the clothes drying chamber to define an exhaust air flow;
   determining a supply air flow rate value indicative of the volumetric air flow of the supply air flow from a supply air flow temperature;
   determining an exhaust air flow rate value indicative of the volumetric air flow of the exhaust air flow from an exhaust air flow temperature; and
   determining a condition of the air flow through the air flow system based on the supply air flow rate value and the exhaust air flow rate value.

14. The method according to claim 13, wherein the determining of the condition of the air flow comprises determining a blockage in the air flow system.

15. The method according to claim 13, wherein the determining of the condition of the air flow comprises determining leakage for the air flow system.

16. The method according to claim 13, wherein the supply air flow rate value is a temperature value of the air supplied to the clothes drying chamber.

17. The method according to claim 13, wherein the exhaust air flow rate value is further determined from at least one of the speed, torque and current of the motorized blower.

18. The method according to claim 13, and further determining an inflection value from a time rate of change of the supply air temperature over a preselected time period.

19. The method according to claim 18, wherein the preselected time period occurs at the initiation of a drying cycle.

20. The method according to claim 18, and further determining the supply air temperature at regular time intervals.

21. The method according to claim 18 and further determining an initial supply air temperature for determining with the inflection value the condition of the air flow through the air flow system.

22. The method according to claim 18, and further determining a minimum supply air temperature for determining with the inflection value the condition of the air flow through the air flow system.

23. The method according to claim 13, wherein the determining of the supply air temperature is determined while the heater is one of energized and deenergized.

24. The method according to claim 23, wherein the determining of the supply air temperature is determined while the heater is both energized and deenergized.

25. The method according to claim 13, wherein the determining of the supply and exhaust flow rate values is based on a change in the supply and exhaust air temperatures, respectively over time.

26. The method according to claim 25, and further comprising determining an inflection value from the change in the supply and exhaust air temperatures, respectively over time, wherein the inflection value is used to determine the condition of the air flow.

27. A method of determining an air flow rate in an air flow system of a clothes dryer comprising a rotating drum defining a clothes drying chamber, with the air flow system supplying and exhausting air from the clothes drying chamber, and a heater to heat the air in the air flow system, the method comprising:

supplying air through the air flow system to define a supply air flow;
determining a temperature of the supply air flow to define a supply air temperature;
determining an air flow rate value indicative of the volumetric flow rate of supply air flowing through the air flow system from the supply air temperature;
comparing the air flow rate value to a predetermined air flow rate value to determine a condition of the air flow through the air flow system; and
determining the presence of a flow restriction in the air flow system based on the condition.

* * * * *